J. DOTTL.
SPRING AND FRAME SUPPORTER FOR MOTOR VEHICLES.
APPLICATION FILED NOV. 16, 1916.
1,254,662.
Patented Jan. 29, 1918.
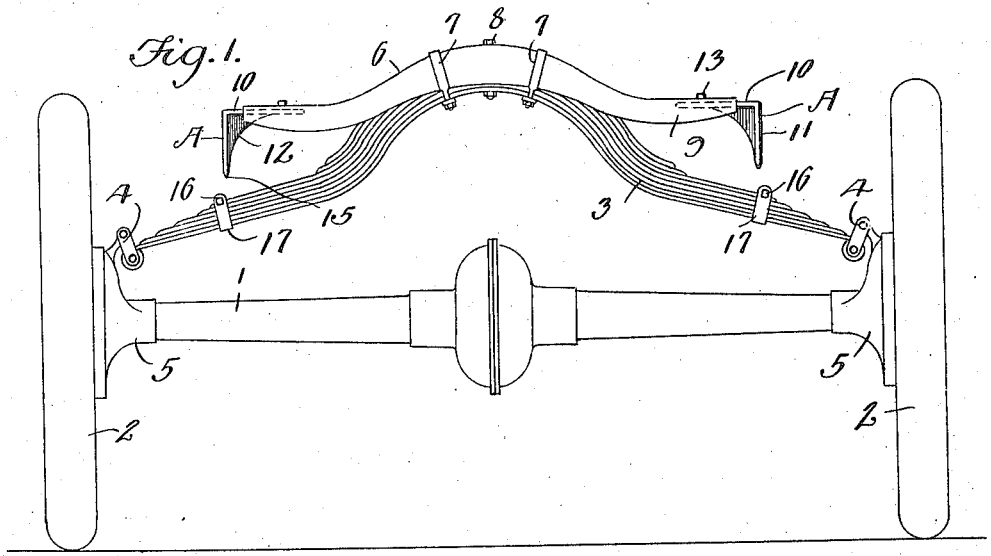
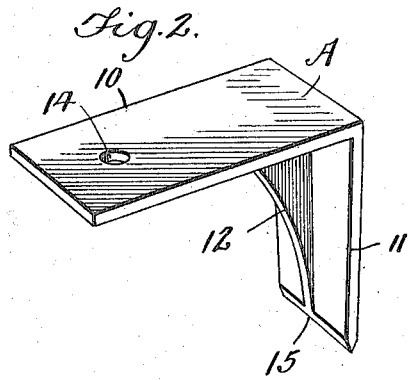
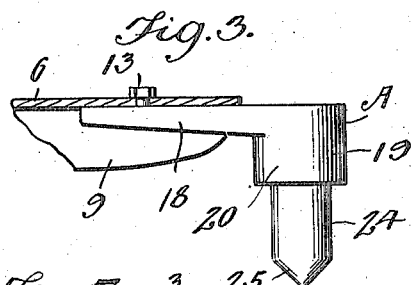
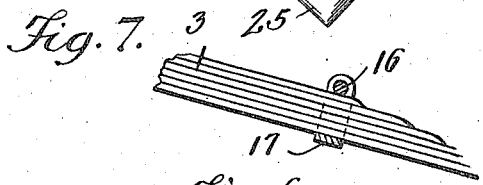
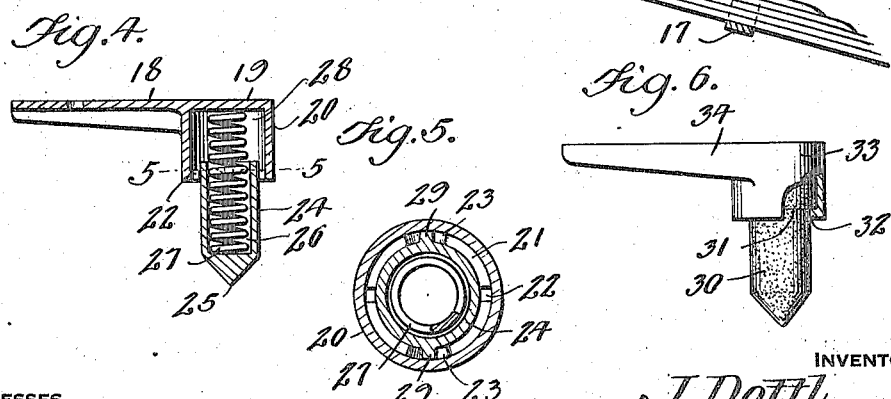
WITNESSES
INVENTOR
J. Dottl,
BY Victor J. Evans
ATTORNEY

UNITED STATES PATENT OFFICE.

JOSEPH DOTTL, OF MADISON, WISCONSIN, ASSIGNOR TO THE DOTTL MANUFACTURING COMPANY, OF MADISON, WISCONSIN, A CORPORATION OF WISCONSIN.

SPRING AND FRAME SUPPORTER FOR MOTOR-VEHICLES.

1,254,662.

Specification of Letters Patent.

Patented Jan. 29, 1918.

Application filed November 16, 1916. Serial No. 131,723.

*To all whom it may concern:*

Be it known that I, JOSEPH DOTTL, a citizen of the United States, residing at Madison, in the county of Dane and State of Wisconsin, have invented new and useful Improvements in Springs and Frame-Supporters for Motor-Vehicles, of which the following is a specification.

This invention relates to spring and frame supporters for motor vehicles the object in view being to provide in connection with the body supporting bolster and spring or springs of a motor vehicle, means whereby, under an excessive load, the weight of the body and the load imposed thereon will be transferred from one portion of a body supporting spring to another portion thereof thereby preventing the overloading of the vehicle springs which may ultimately result in the bending and breakage thereof, the device thus adapting the vehicle to both light and heavy loads and affording the necessary resilient support for different loads.

By means of the invention hereinafter described, the load on the vehicle may be doubled or materially increased without causing the body supporting spring or springs to bear against or come in contact with the axle or axle housing, the weakest point or points of the spring or springs is protected and the same relieved, and excessive swaying or swinging motion of the body under excessive loads is eliminated and incidentally the tendency to shear off the center bolt, the device serving to sustain the body and its load in an approximately horizontal position and also preventing the sudden upward tilting of the body at one end. Incidentally the device relieves the wear and tear on the tires and also on the car as a whole by preventing the lateral swinging of the body and load when turning corners or traveling over rough road surfaces.

A further object in view is to provide a device of the character referred to which may be readily applied to vehicles now in use without extra fittings.

With the above and other objects in view, the invention consists in the novel construction, combination and arrangement of parts, herein described, illustrated and claimed.

In the accompanying drawings: Figure 1 is a rear elevation of a sufficient portion of a motor vehicle to illustrate the present invention in its applied relation thereto. Fig. 2 is an enlarged detail perspective view of one of the supporters. Fig. 3 is a fragmentary vertical section taken longitudinally of the body bolster, showing a supporter of modified construction. Fig. 4 is a vertical longitudinal section through the supporter shown in Fig. 3. Fig. 5 is an enlarged horizontal section on the line 5—5 of Fig. 4 looking downwardly. Fig. 6 is a broken elevation of another form of supporter. Fig. 7 is a fragmentary vertical section showing the construction of the spring clip.

Referring to the drawings 1 designates the axle housing of a motor vehicle, 2 oppositely located wheels connected with the axle contained in the housing 1, 3 one of the body supporting springs connected by the usual swinging links or shackles 4 to the expanded end portions 5 of the housing 1, and 6, one of the bolsters which is mounted upon the spring 3 and shown as connected thereto by the usual clips 7 and center bolt 8. The bolster 6 comprises the usual flanges 9 extending along the opposite longitudinal edges of the body of the bolster and in spaced relation to each other, said flanges 9 extending downwardly from the bolster body as shown in Fig. 3. All of the parts thus far described are of the usual well known construction and relative arrangement.

In carrying out the present invention, I employ at each end of the bolster 6 a supporter designated generally at A. The supporter, shown in Fig. 2, comprises a substantially horizontal upper portion 10 and a substantially vertical portion 11 formed integrally therewith and extending downwardly from the outer end thereof as shown in Fig. 1, the portions 10 and 11 being braced in relation to each other by an internal corner reinforcing web 12. The portion 10 of the supporter is of suitable width to fit between the flanges 9 of the bolster 6 so as to contact with the inner faces of said flanges, thereby preventing the supporter from turning laterally, the supporter being fixedly secured to the bolster by means of a fastener 13 which is inserted through a hole 14 in the supporter and also through a hole in the body of the bolster as indicated in Fig. 1. The bottom edge of the vertical portion 11 of the supporter is preferably edged or tapered as indicated at 15 so as to engage the inner side of the bolt 16 associated with the usual clip 17 which binds the leaves of the springs 3 together at the point shown in Fig. 1.

It will now be apparent that when an excessive load is brought to bear on the bolster 6, the lower edges 15 of the supporters A will bear against the top of the spring 3 at points just inside of the bolt 16 and the weight will thus be transferred from the central portion of the spring 3 to points adjacent to the bolts 16, a comparatively short distance from the points where said spring 3 is connected to the swinging links or shackles 4. The vertical portions 11 of the supporters thus co-act with the bolts 16 to prevent lateral tilting of the body of the vehicle and abnormal distortion of the body supporting spring.

In lieu of the supporter shown in Fig. 2, the supporter illustrated in Figs. 3 and 4 may be employed. In this instance, the supporter A comprises an upper portion or arm 18 which constitutes an extension of the bolster, the same as the supporter shown in Figs. 1 and 2, and is secured to the bolster in the same manner as previously described. The outer end of the arm 18 is formed with a downwardly extending cylindrical enlargement 19 of tubular formation as shown at 20 and open at the bottom with the exception of an internal annular flange 21 and this flange is shown as formed at diametrically opposite points with slots or notches 22 and also formed in its upper face with depressions 23 the purpose of which will appear. 24 designates a post which has the same function as the arm 11 of the supporter shown in Fig. 2, the lower end thereof being pointed as indicated at 25 to engage the adjacent bolt 16 above referred to. The post 24 is formed with a central longitudinal bore 26 open at its upper end, and a coiled spring 27 is placed within the bore 26 and extends upwardly beyond the post 24, the upper extremity thereof bearing against the upper wall of the bore or recess 28 in the enlargement 19 as shown in Fig. 4. Adjacent to its upper end, the post 24 has outwardly projecting lugs 29 located at diametrically opposite points and adapted to be inserted upwardly through the slots or notches 22 above described, after which a quarter turn is given to the post 24 until the lugs 29 are received in the depressions 23, the post 24 being thus locked in place and prevented from escaping.

The lower extremity of the post 24, when the supporter is fastened to the bolster 6, occupies the same position and relation as the bottom edge of the portion 11 of the supporter first described and therefore the post 24 is not brought into action until a sufficiently heavy load has been imposed on the bolster 6. After this the springs 27 act as a cushioning means between the bolster and the body supporting spring. The supporter shown in Fig. 6 is of the same general type previously described but in lieu of the vertically movable post 24 and the spring 27 shown in Fig. 4, a resilient post 30 is employed, the same being preferably composed of rubber or other flexible or elastic material, the upper end portion of the post 30 being enlarged to form an annular shoulder 31 which engages an inwardly extending annular flange 32 at the bottom of the enlarged portion 33 of the arm 34, which corresponds with the arm 18 of Fig. 4.

In each instance, above described, the supporter forms in effect an end extension of the body supporting bolster 6 so that when an unusually heavy load is imposed upon the vehicle, the load will be transferred from the central portion of the body supporting spring to points adjacent to the end portions thereof and much closer to the vehicle wheels. This not only protects the body supporting spring and prevents injury thereto but lateral swaying of the vehicle body and its load is to a very great extent eliminated and the body is carried on a comparatively level poise thereby relieving excessive wear and tear on the wheel base, frame, wheels, tires and axles of the vehicle.

I claim:—

1. A vehicle frame, a bolster extending transversely thereof and having parallel longitudinal flanges extending downwardly therefrom, and an arched body supporting main spring centrally secured to the bolster and terminally connected with the axle housing, in combination with auxiliary body supporting units interposed between the bolster ends and said spring, each unit comprising a downwardly extending member located beyond the adjacent end of the bolster and above and normally out of contact with the body supporting spring but adapted to rest upon said spring when an abnormal load is imposed on the bolster.

2. A vehicle frame, a bolster extending transversely thereof and having parallel longitudinal flanges extending downwardly therefrom, and an arched body supporting main spring centrally secured to the bolster and terminally connected with the axle housing, in combination with auxiliary body supporting units interposed between the bolster ends and said spring, each unit comprising a downwardly extending member located beyond the adjacent end of the bolster and above and normally out of contact with the body supporting spring but adapted to rest upon said spring when an abnormal load is imposed on the bolster, said downwardly extending member being yieldable in a substantially vertical direction.

3. A vehicle frame, a bolster extending transversely thereof and having parallel longitudinal flanges extending downwardly therefrom, an arched body supporting main spring centrally secured to the bolster and terminally connected with the axle housing, in combination with auxiliary body supporting units interposed between the bolster ends and said spring, each unit comprising a downwardly extending member located beyond the adjacent end of the bolster and above and normally out of contact with the body supporting spring but adapted to rest upon said spring when an abnormal load is imposed on the bolster, said downwardly extending member being yieldable in a substantially vertical direction, and embodying telescopically related portions and an expansion spring contained within the last named portions.

4. A vehicle frame, a bolster extending transversely thereof and having parallel longitudinal flanges extending downwardly therefrom, an arched body supporting main spring centrally secured to the bolster and terminally connected with the axle housing, in combination with auxiliary body supporting units interposed between the bolster ends and said spring, each unit comprising a downwardly extending member located beyond the adjacent end of the bolster and above and normally out of contact with the body supporting spring but adapted to rest upon said spring when an abnormal load is imposed on the bolster, said downwardly extending member being yieldable in a substantially vertical direction and embodying telescopically related portions having a detachable and interlocking engagement with each other, and an expansion spring contained within the last named portions.

5. An axle housing, a bolster extending longitudinally thereof, an arched body-supporting main spring centrally secured to the bolster and terminally connected to the axle housing at each end, both end portions of the spring lying in the same vertical plane longitudinally of the axle housing, in combination with auxiliary body supporting units interposed between the end portions of the bolster and the end portions of the spring which are connected to the axle housing on the same side of the transverse central plane of the axle housing, said bolster and spring constituting two members, said units being attached to one only of said members and being so constructed and arranged that the units are held in proper alinement relatively to the other of said members regardless of whether they contact with said other member or not.

6. An axle housing, a bolster extending longitudinally thereof, an arched body-supporting main spring centrally secured to the bolster and terminally connected to the axle housing at each end, both end portions of the spring lying in the same vertical plane longitudinally of the axle housing, in combination with auxiliary body supporting units interposed between the end portions of the bolster and the end portions of the spring which are connected to the axle housing on the same side of the transverse central plane of the axle housing, said units being attached to the bolster only and including means so constructed and arranged that the units are held in proper alinement relatively to the spring regardless of whether they contact with said spring or not.

7. An axle housing, a bolster extending longitudinally thereof, an arched body-supporting main spring centrally secured to the bolster and terminally connected to the axle housing, in combination with auxiliary body supporting units interposed between the end portions of the bolster and the corresponding end portions of the spring, said bolster and spring constituting two members and said units being attached to one only of said members and being out of contact with one of said members under light loads but being adapted to engage said member when a large load is imposed on the bolster.

8. An axle housing, a bolster extending longitudinally thereof, an arched body-supporting main spring centrally secured to the bolster and terminally connected to the axle housing at each end, both end portions of the spring lying in the same vertical plane transversely of the vehicle, in combination with auxiliary body supporting units interposed between the end portions of the bolster and the corresponding end portions of the spring, said bolster and spring constituting two members and said units being rigidly attached at one end to one of said members, said units each including a resilient member through which loads may be transmitted to the main spring, said units being so constructed and arranged that the other ends thereof are maintained in proper alinement with the other of said members regardless of whether they engage said member or not.

9. An axle housing, a bolster extending longitudinally thereof, an arched body-supporting main spring centrally secured to the bolster and terminally connected to the axle housing at each end, both end portions of the spring lying in the same vertical plane transversely of the vehicle, in combination with auxiliary body supporting units interposed between the end portions of the bolster and the corresponding end portions of the spring, said units being rigidly attached to said bolster only and each including a resilient member through which loads on the bolster may be transmitted to the main spring, said units being so constructed and arranged that their other ends are maintained in proper alinement with the main spring regardless of whether they engage said spring or not.

10. An axle housing, a bolster extending longitudinally thereof, an arched body-supporting main spring centrally secured to the bolster and terminally connected to the axle housing, both end portions of the spring lying in the same vertical plane longitudinally of the axle housing, in combination with auxiliary body supporting units interposed between the end portions of the bolster and the corresponding end portions of the spring, said bolster and spring constituting two members and said units being rigidly attached at one end to one only of said members, each of the units including a resilient member and a telescopic housing for said member, said housing being so constructed and arranged that the movable portion thereof is maintained in proper alinement with the other of the two members regardless of whether the unit engages said member or not.

11. An axle housing, a bolster extending longitudinally thereof, an arched body-supporting main spring centrally secured to the bolster and terminally connected to the axle housing, and means for transmitting loads from the end portions of the bolster to the corresponding end portions of the spring, said means being out of contact with said spring under light loads, said means comprising housings including telescopic sections, the sections including means whereby the movement of one longitudinally in respect to the other is limited, and springs inclosed by said housings and tending to hold the movable sections at the limit of their movement in one direction.

12. In combination, a pair of wheels, a bolster extending longitudinally of and substantially above the common axis of said wheels, said means including a main spring centrally secured to the bolster and housings including a pair of telescopic sections, means for rigidly connecting one of the sections to the corresponding end of the bolster so that the section is immovable in respect to said bolster, said sections including means whereby the movement of the other section in respect to the first named section is limited both in extent and direction, and springs inclosed by said housings, said springs tending to hold the movable sections at the limit of their movement in one direction.

13. In combination, a pair of wheels, a bolster extending longitudinally of and substantially above the common axis of said wheels, means for transmitting loads from said bolster to said wheels, said means including a main spring centrally secured to the bolster, the entire load being transmitted from the bolster to the central portion of the main spring when the load is small, said bolster and main spring constituting two members and means whereby a portion of the load is transmitted from the bolster to the main spring at points considerably nearer the ends of the latter when the load is increased, said last named means being out of contact with one of the members when the load is a minimum.

14. In combination, a pair of wheels, a bolster extending longitudinally of and substantially above the common axis of said wheels, and means for transmitting loads from said bolster to said wheels, said means including a main leaf spring centrally secured to the bolster and clips whereby the ends of the leaves of the spring are held in alinement with each other, the entire load being transmitted from the bolster to the central portion of the main spring when the load is small, said bolster and main spring constituting two members and means, supported solely by one of said members and associated with the clips whereby a portion of the load is transmitted from the bolster to the main spring at points considerably nearer the ends of the latter when the load is increased, said last named means being out of contact with one of the members when the load is a minimum.

15. In combination, a pair of wheels, a bolster extending longitudinally of and substantially above the common axis of said wheels, means for transmitting loads from said bolster to said wheels, said means including a main spring centrally secured to the bolster and having its end portions disposed in the same vertical plane parallel to the axis of the wheels, and auxiliary body supporting units rigidly connected to the bolster, said units being supported solely by the bolster and depending from the end portions thereof and being so constructed and arranged that their lower ends are maintained in substantially the same alinement relatively to the bolster at all times.

In testimony whereof I affix my signature

JOSEPH DOTTL.